| United States Patent [19] | [11] Patent Number: 4,888,058 |
|---|---|
| Rosenberg et al. | [45] Date of Patent: Dec. 19, 1989 |

[54] SILICA FUME SLURRY

[75] Inventors: Arnold M. Rosenberg, Potomac; James M. Gaidis, Ellicott City; Lawrence J. Kindt, Woodbine, all of Md.

[73] Assignee: W. R. Grace & Co.-Conn., New York, N.Y.

[21] Appl. No.: 912,018

[22] Filed: Sep. 29, 1986

[51] Int. Cl.$^4$ ............... C04B 14/04; C04B 22/16; C04B 24/06
[52] U.S. Cl. .................................. 106/98; 106/89; 106/90; 106/314
[58] Field of Search ................ 106/98, 314, 89, 90

[56] References Cited

U.S. PATENT DOCUMENTS 4,087,285  5/1978  Kurz ............................ 106/98 X
4,328,036  5/1982  Nelson et al. ................ 106/85

FOREIGN PATENT DOCUMENTS 8000959  5/1980  European Pat. Off. .
2523571  9/1983  France ........................... 106/98
5123513  2/1970  Japan ............................ 106/98
2131409  6/1984  United Kingdom .

OTHER PUBLICATIONS

Chem. Abstract, "Hydraulic Cement Comp. and Cement Moldings", Umezawa et al., 1986.

*Primary Examiner*—William R. Dixon, Jr.
*Assistant Examiner*—David M. Brunsman
*Attorney, Agent, or Firm*—Howard J. Troffkin

[57] ABSTRACT

A stable, aqueous dispersion of silica fume is formed using a 70–80% ferrosilicon production fume by-product by the inclusion of very small amounts of a stabilizing agent selected from a phosphoric acid, citric acid, hydrofluoric, fluorosilicic acid or their sodium or potassium salts or mixtures thereof.

12 Claims, No Drawings

SILICA FUME SLURRY

The present invention is directed to the formation and utilization of a stabilized aqueous dispersions of silica fume in high concentration. The presently described aqueous dispersions provide a means to readily transport, meter and handle silica fume in highly concentrated form and for its easy utilization in various industrial applications. The composition described herein has been found highly suitable as an admixture for cementatious compositions to enhance its durability and strength characteristics.

During the commercial production of ferrosilicon alloys, the main by-product is a so-called silica fume having a content of from about 80 to about 90 weight percent silicon dioxide. The process of producing the ferrosilicon alloy consists of feeding a charge of quartz, scrap iron, coal and wood chips into a furnace provided with carbon electrodes. At the high temperature developed at the bottom of the furnace, the silicon dioxide is reduced by the carbon to metallic silicon which combines with the iron to produce the ferrosilicon alloy. The gaseous by-products are carbon monoxide, which oxidizes to carbon dioxide, and silicon suboxide which oxidizes to silicon dioxide as the gases pass to the top of the furnace. The particulate material which is the effluent of this process is called silica fume.

Silicon metal and alloys of silicon, such as ferrosilicon alloys, can be formed using the furnace described above. For a given product, one produces a condensed silica fume by-product that has a distinct, constant chemical composition and is characteristic of the silicon material being formed.

The powdery silica fume is very difficult to handle, transport and to use due to its low bulk density and fluffy nature. This material is, therefore, normally converted into aqueous dispersions so that its transportation, metering and general handling can be more readily accomplished. The problems with such dispersions are the poor economics associated with transporting large volumes of water when the dispersion has low concentrations (about 45% or less) of solids or the poor stability resulting in gelling and solidification of dispersions which have a high solid concentration of greater than about 45%. To overcome the solidification problem, dispersions of as low as 20% solids have been used.

Silica fume is known to enhance the strength of the cured cement based formations. However, to accomplish this desired result, the fumed silica must be used in large amounts. Whether used at the ready mix site or added to the cement mix at the construction site, it is impractical to utilize dry silica fume.

Silica fume is generally used to form low water to cement ratio cement compositions. Known stable and fluid dispersions of silica fume which are presently commercially available are not suitable for producing these compositions as the water content of these slurries far exceeds that required to provide the desired water to cement ratios. High content dispersions are known not to be stable nor storable under field conditions and do not retain their fluidity so as to be capable of uniformly mixing with the other components of the cement-based composition when utilized at a ready mix or construction cite.

British patent application No. 2,131,409-A discloses that aqueous dispersions of silica fume obtained from silicon and ferro-silicon production can be formed by including at least one non-high range water-reducing agent or at least one high range water reducing agent. These agents are lignin sulfonates, melamine derivatives or naphthalene derivatives as well as cellulose ethers, sugars, carbohydrates, certain zinc salts as well as certain hydroxylated carboxylic acids and their salts. Although this reference suggests that a vast number of water-reducing agents can be used to form a silica dispersion, it is well known that a number of these agents do not provide a stable dispersion suitable for being manufactured, stored, shipped and subsequently used.

Japanese Published Application No. 61-117143 shows the ineffectiveness of several of the agents taught in the above British reference. The Japanese reference shows that only lignin sulfonates (Ultrazin) and/or a $C_5$–$C_{10}$ olefin/maleic anhydride copolymer (Work 500) reduces the viscosity of a silica fume dispersion. These dispersions, however, are not stable over extended time periods.

One object of the present invention is to provide an aqueous silica fume dispersion having a high solid content which is capable of retaining fluidity over an extended period of time.

An additional object of the present invention is to provide a stable, fluid, high content silica fume aqueous dispersion suitable for use in forming cement-based compositions especially compositions having low water to cement ratios.

Still a further object of the present invention is to provide an aqueous fume dispersion which is stable at high temperatures.

SUMMARY OF THE INVENTION

The present invention is directed to stable aqueous silica fume dispersions containing from about 20 to 75 weight percent of a silica fume by-product obtained from the production of a ferrosilicon alloy having iron to silicon metal content in the weight ratio of from 20:80 to 30:70. The dispersion is stabilized by the presence of from 0.25 to 1 percent of a stabilizing agent selected from a phosphoric acid, fluorosilicic acid, hydrofluoric acid, citric acid, their sodium or potassium salts, and mixtures thereof.

The subject dispersions have been found useful as an admixture to enhance the resultant compressive strength of cement-based compositions and to provide a means to obtain cement-based composition having a lower water-to-cement ratio.

DETAILED DESCRIPTION OF THE INVENTION

The silica fume found useful in the present invention is an amorphous silica by-product formed during conventional ferrosilicon metal alloy production. The term "silica fume" as used in the present application and the appended claims is a micro particulate by-product material retrieved from the stack gases of electric arc furnaces or the like during production of a ferrosilicon alloy in which the iron to silicon metal content is in a ratio of 30:70 to 20:80. This product presents a silica fume by product having components relegated by the alloy production.

The main constituent of the subject silica fume is silicon dioxide present in from about 86 to about 90 percent by weight. The analysis and properties of typical silica fumes suitable for use in forming the present stable aqueous dispersion is given below:

| Component | % by weight |
| --- | --- |
| $SiO_2$ | 86–90 |
| SiC | 0.1–0.4 |
| $Fe_2O_3$ | 0.3–5.0 |
| $TiO_2$ | 0.02–0.06 |
| $Al_2O_3$ | 0.2–1.7 |
| MgO | 1.0–3.5 |
| CaO | 0.2–0.5 |
| $Na_2O$ | 0.3–1.8 |
| $K_2O$ | 1.5–3.5 |
| S | 0.2–0.4 |
| C | 0.8–2.3 |
| P | 0.03– |
| Ignition loss (1000° C.) | 2.4–4.0 |
| Bulk density, from bunker, g/L | 200–300 |
| Bulk density, compacted, g/L | 500–700 |
| Real density, g/cm$^3$ | 2.20– |
| Specific surface, m$^2$/g | 18–22 |
| Primary particle size, percentage <1 μm | 90 |

By forming a dispersion with the components described hereinbelow, one can achieve a stable, fluid composition which contains up to 75 weight percent silica fume by-product therein. The dispersion may contain smaller amounts of silica fume if desired. The exact amount will be dictated by the end use for which it is intended. Dispersion may contain from about 20 to 75 weight percent, preferably from about 45 to 65 weight percent silica fume. Stable dispersions having silica fume in amounts of from at least 50 to 65 weight percent and most preferably from about 55 to 65 weight percent are highly desirable as an admixture to form low water to cement ratio compositions. To provide a stable, fluid silica fume dispersion according to the present invention requires the use of silica fume by-product obtained from ferrosilicon alloy production which provide alloys with from about 70 to 80% silicon and a stabilizing agent selected from a phosphoric acid, such as the various known polyphosphoric acids; citric acid; or their sodium or potassium salts or mixtures thereof. The preferred materials are the sodium salts of the above mentioned free acids. The stability of the dispersion can be further enhanced by using, in combination with the above described stabilizing agents, a stabilizing agent selected from fluorosilicic acid, hydrofluoric acid or their sodium or potassium salts or mixtures thereof. The total stabilizing material should be present in the aqueous dispersion in amounts of from 0.25 to 1.0 and preferably from 0.4 to 0.85 weight percent.

The subject composition formed from silica fume and the above described acid or its salt has been found to be a stable fluid exhibiting low viscosity. The viscosity of the dispersion, as measured using standard techniques at room temperature with a Brookfield viscometer using a No. 3 spindle at 60 rpm or equivalent test is normally less than about 2000 cP and preferably less than about 1000 cP. The particular viscosity will be determined by the amount of the stabilizing agent and the silica fume content.

The subject composition has been found to be exceptionally suitable for forming high strength cement based compositions such as mortar, cement and concrete compositions formed with a hydraulic cement such as Portland cement. The subject composition has, in particular, been found highly suitable for forming cement-based compositions having low water to cement ratios such as 0.45 or less (e.g., 0.25 to about 0.45) and can be used to form cement based compositions with water to cement ratios of 0.40 or less (preferably 0.33 to 0.4) and even less than 0.37. This can be done with the present composition because (1) it is capable of remaining fluid and is therefore readily dispersible in the cement-based composition; (2) it contains very high solid (silica fume) content and very little water; and (3) it is capable of exhibiting stability at elevated temperatures such as are encountered at storage facilities and at the mixing site.

The amount of the present silica fume solid which can be added to a cement based composition can be up to about 25 weight percent based on the cement content. Preferably from 1 to 20 and most preferably from 5 to 15 weight percent based on the cement content should be used to form a high strength cement formation. The silica fume normally replaces an equivalent portion of the aggregate used to form the cement based composition. The resultant formation exhibits very high compressive strength of greater than 7000 psi and even greater than 9000 psi This is believed, although not meant to be a limitation on the present invention, to be due to the combination of several factors, including the interaction of the silica fume with the cement, the high content of silica fume in the resultant formation and the low water-to-cement ratio of the initially formed hydraulic cement based composition.

The following examples are given for illustrative purposes only and are not meant to be a limitation on the present invention as described herein and defined in the appended claims. All parts and percentages are by weight unless otherwise indicated.

EXAMPLE 1

Into a vessel, equipt with a high speed stirrer, was placed 39.25 parts water, 0.5 part sodium tripolyphosphate and 0.25 part citric acid. 60 parts of a silica fume obtained from a commercial production of 75% ferrosilicon alloy was added slowly to the solution while rapidly stirring. The resultant dispersion was fluid, had a pH of 5.88 and a viscosity of 800 cP. The dispersion was observed to remain fluid during a three week storage under ambient conditions. The viscosity was measured periodically to be 800 cP after one week; 518 cP after two weeks; and 290 cP after three weeks.

EXAMPLE 2

A dispersion was formed in the same manner as described in Example 1 above except that 0.25 part of $Na_2SiF_6$ was used in place of the polyphosphate. The initial dispersion was a thick semifluid which upon aging for a short period became fluid. The viscosity at 4 days was 650 cP; at 8 days was 560 cP; and at 17 days was 380 cP.

EXAMPLE 3

A series of dispersions were formed in the same manner as described in Example 1 above except that the stabilizing agent was a combination of agents as indicated in the Table 1 below. In each case, the dispersion was fluid upon formation and remained fluid over an extended period. The viscosity of the dispersions were measured during the initial period of storage and reported below. All of the samples remained fluid over an extended period of storage.

TABLE 1

| Sample | Stabilizing Agent (% by wt) | Age (days) | Viscosity cP | Condition |
|---|---|---|---|---|
| 1 | Citric Acid (0.5) | init. | 832 | |
|   | NaF (0.25) | 1 | 472 | |
|   |   | 2 | 408 | fluid-no set |
|   |   | 3 | 442 | fluid-no set |
|   |   | 4 | 352 | fluid-no set |
|   |   | 7 | 336 | fluid-no set |
| 2 | Citric Acid (0.25) | init. | 378 | |
|   | NaF (0.5) | 1 | 228 | fluid-no set |
|   |   | 2 | 410 | fluid-no set |
|   |   | 3 | 538 | fluid-no set |
|   |   | 4 | 230 | fluid-no set |
|   |   | 7 | 288 | fluid-no set |
| 3 | Citric Acid (0.25) | init. | 778 | |
|   | NaF (0.25) | 1 | 572 | |
|   | $Na_2SiF_6$ (0.25) | 2 | 416 | fluid-no set |
|   |   | 3 | 584 | fluid-no set |
|   |   | 4 | 354 | fluid-no set |
|   |   | 7 | 340 | fluid-no set |
| 4 | STPP* (0.25) | init. | 1,000 | |
|   | Citric Acid (0.25) | 1 | 884 | fluid-no set |
|   | $Na_2SiF_6$ (0.25) | 2 | 492 | fluid-no set |
|   |   | 3 | 348 | fluid-no set |
|   |   | 6 | 308 | fluid-no set |
| 5 | STPP* (0.25) | init. | 980 | fluid-no set |
|   | Citric Acid (0.25) | 7 | 330 | fluid-no set |
|   | NaF (0.25) | 16 | 290 | fluid-no set |

*STPP = Sodium tripolyphosphate

What is claimed is:

1. A composition consisting essentially of an aqueous slurry containing from 45–65 weight percent silica fume obtained from 70 to 80 percent ferrosilicon metal alloy production and from 0.25 to 1 percent of a stabilizing agent selected from a tripolyphosphate, citric acid, the sodium or potassium salts of said acids and mixtures thereof.

2. The composition of claim 1 wherein the stabilizing agent is selected from sodium tripolyphosphate and potassium tripolyphosphate.

3. The composition of claim 1 wherein the stabilizing agent is combined with an agent selected from fluorosilicic acid, hydrofluoric acid, the sodium or potassium salts of said acids and mixtures thereof.

4. The composition of claim 2 wherein the stabilizing agent is combined with an agent selected from sodium fluorosilicate, potassium fluorosilicate, sodium fluoride or potassium fluoride or mixtures thereof.

5. The composition of claim 1 wherein the stabilizing agent is selected from citric acid or its sodium or potassium salt.

6. A process of forming a cement-based composition comprising forming a mixture of hydraulic cement and particulate material together, introducing the composition of claim 1 to said mixture, adding sufficient water to said mixture to cause the water to cement weight ratio to be from about 0.25 to 0.45.

7. A process of forming a cement-based composition comprising forming a mixture of hydraulic cement and particulate material together, introducing the composition of claim 2 to said mixture, adding sufficient water to said mixture to cause the water to cement weight ratio to be from about 0.25 to 0.45.

8. A process of forming a cement-based composition comprising forming a mixture of hydraulic cement and particulate material together, introducing the composition of claim 3 to said mixture, adding sufficient water to said mixture to cause the water to cement weight ratio to be from about 0.25 to 0.45.

9. A process of forming a cement-based composition comprising forming a mixture of hydraulic cement and particulate material together, introducing the composition of claim 4 to said mixture, adding sufficient water to said mixture to cause the water to cement weight ratio to be from about 0.35 to 0.45.

10. The process of claim 6 wherein the water to cement ratio is from 0.35 to 0.40.

11. The process of claim 7 wherein the water to cement ratio is from 0.35 to 0.40.

12. A process of forming a cement-based composition comprising forming a mixture of hydraulic cement and particulate material together, introducing the composition of claim 5 to said mixture, adding sufficient water to said mixture to cause the water to cement weight ratio to be from about 0.25 to 0.45.

* * * * *